Patented Dec. 27, 1932

1,892,273

UNITED STATES PATENT OFFICE

WILFORD J. HAWKINS, OF BROOKLYN, NEW YORK, ASSIGNOR TO AMERICAN MACHINE & FOUNDRY COMPANY, A CORPORATION OF NEW JERSEY

FUSIBLE ALLOY AND METHOD OF MAKING THE SAME

No Drawing.   Application filed September 13, 1927.   Serial No. 219,366.

This invention relates to an improved fusible alloy capable of being applied in a melted state to metallic surfaces to unite said surfaces, and to a method of making the same.

Enormous quantities of solder are used in the various industries, for the purpose of uniting metallic surfaces. Solder comprises lead containing various but large percentages of tin, commonly forty per cent or more. Tin is several times as costly as lead. The presence of large percentages of tin makes solder much more costly than lead.

I have discovered that a much cheaper fusible alloy for the same and other purposes can be made by incorporating in substantially pure lead a modicum of phosphide of lead to increase its fluidity and tenacity and to cause the resultant alloy to adhere firmly to the surfaces to be united.

The modicum of phosphide of lead may be varied, but for general use an alloy comprising substantially pure leading containing approximately one-tenth of one percent of phosphide of lead has been found in practice to be superior to solder as a metallic surface uniting medium. Its superior fluidity causes it to run in between adjacent metallic surfaces more readily and more evenly than either pure lead or solder, and its superior tenacity causes it to adhere to such surfaces more firmly than either pure lead or solder and gives it greater strength. For special purposes where still greater strength is required, the percentage of phosphide of lead may be increased. Conversely, where no more strength than that of common solder is required, the percentage of phosphide of lead may be reduced to as low as one-twentieth of one per cent, if desired.

In making the improved alloy, substantially pure lead is melted, and the phosphide of lead introduced therein, either in a molten state or in a solid state, and fused therewith. If introduced in a molten state, the phosphide of lead rapidly spreads through the pure lead and converts it into the improved fusible alloy possessing greater fluidity and greater tenacity than either pure lead or solder.

The alloy is then formed into ingots, bars, or wire, as solder is. If the phosphide of lead is introduced in a solid state into the molten pure lead, it must of course be melted by the heat of the molten pure lead before it can spread through the latter, but the percentage of phosphide of lead is so small that the time required is short.

The percentage of phosphide of lead is so small that the alloy, like the base metal, is about ninety-nine and nine-tenths per cent pure lead, and non-corrosive in its nature. It is therefore capable of use wherever its non-corrosive property and superior fluidity and tenacity are useful; and such use is contemplated.

Metallic surfaces may be united by assembling them and dipping the assemblage in the alloy while the latter is in a melted state; or, an ordinary soldering iron may be used with a bar or wire of the alloy, precisely as it is used with solder.

The alloy is dark and dull when applied, and becomes darker and duller. Where a bright or lustrous appearance is desired, a modicum of brightening metal, such as aluminum, antimony, tin, or zinc, may be fused with the alloy at slightly increased cost, merely to improve its appearance. It has been found in practice that the incorporation in the alloy of approximately one per cent of brightening metal satisfactorily effects the desired result, in most cases. More may be used, however, if greater brightness is desired.

Although three methods of making phosphide of lead are known, the following one gives satisfactory results and at present appears to be the best for the purposes of this invention. Pure lead and yellow phosphorus are placed in a steel container large enough to also contain air, after which the container is heated to redness and kept in that condition for about four hours under an internal pressure of about 8000 lbs. developed by the expansion of its contents. The resultant substance is then cast into ingots. This process results in production of a phosphoric metallic substance which is true phosphide of lead having permanent characteristics not possessed by lead or phosphorus, and having a remarkable and heretofore unknown affinity for and action on lead, due to their common origin.

For such other available information relative to the Hittorf and other processes of making phosphide of lead, the reader will search the following European text books on inorganic chemistry: Luick and Moller; A. Stock and Fr. Gomolka; Bossuet and Hackspill; Friend, vol. 5; and Gmelin, vol. 4.

What is claimed is:

1. An alloy composed of lead, phosphide of lead in quantity sufficient to increase the fluidity, the tenacity, and the strength of the lead, and approximately one per cent of brightening metal.

2. An alloy composed of lead, approximately one-tenth of one per cent of phosphide of lead, and approximately one per cent of brightening metal.

3. The method of treating lead to increase its fluidity, its tenacity, and its strength, which consists in incorporating therein approximately one-tenth of one per cent of phosphide of lead.

4. The method of treating lead to increase its fluidity, its tenacity, and its strength, and to brighten its color, which consists in incorporating therein approximately one-tenth of one per cent of phosphide of lead and approximately one per cent of brightening metal.

In testimony whereof, I have signed my name to this specification.

WILFORD J. HAWKINS.